(12) United States Patent
Hashimoto

(10) Patent No.: US 6,884,381 B1
(45) Date of Patent: Apr. 26, 2005

(54) INJECTION MOLDING METHOD AND DEVICE

(75) Inventor: Noritsugu Hashimoto, Takaoka (JP)

(73) Assignee: Takaoka Seiko Co., Ltd., Takaoka (JP)

( * ) Notice: Subject to any disclaimer, the term of this patent is extended or adjusted under 35 U.S.C. 154(b) by 0 days.

(21) Appl. No.: 09/979,265

(22) PCT Filed: Sep. 22, 2000

(86) PCT No.: PCT/JP00/06540

§ 371 (c)(1),
(2), (4) Date: Nov. 21, 2001

(87) PCT Pub. No.: WO01/78960

PCT Pub. Date: Oct. 25, 2001

(30) Foreign Application Priority Data

Apr. 13, 2000 (JP) ........................ 2000-112363

(51) Int. Cl.$^7$ ............................................. B29C 45/27
(52) U.S. Cl. ............................ 264/328.9; 264/328.12; 425/567
(58) Field of Search ........................ 264/328.1, 328.9, 264/328.12, 328.16; 425/542, 567, 568, 572, 573, 577

(56) References Cited

U.S. PATENT DOCUMENTS

| | | | |
|---|---|---|---|
| 3,626,051 A | * 12/1971 | Liautaud | ................. 264/328.8 |
| 5,068,065 A | * 11/1991 | Maus et al. | ............. 264/328.11 |
| 5,094,603 A | * 3/1992 | Gellert | ........................ 425/130 |
| 5,219,593 A | * 6/1993 | Schmidt et al. | ............. 425/549 |
| 5,785,915 A | 7/1998 | Osuan-Diaz | |
| 5,820,803 A | 10/1998 | Hashimoto | |
| 5,840,231 A | * 11/1998 | Teng | .......................... 264/154 |
| 5,858,301 A | 1/1999 | Hashimoto | |
| 6,030,198 A | * 2/2000 | Babin | ......................... 425/130 |
| 6,047,821 A | 4/2000 | Hashimoto et al. | |
| 6,077,470 A | * 6/2000 | Beaumont | ................ 264/328.8 |
| 6,235,230 B1 | * 5/2001 | Puniello | ................ 264/328.12 |
| 6,277,308 B1 | * 8/2001 | Kiernicki et al. | ........... 425/568 |

FOREIGN PATENT DOCUMENTS

| | | | |
|---|---|---|---|
| JP | 58131042 | | 8/1983 |
| JP | 4-15607 | * | 1/1992 |
| JP | 4-16303 | * | 1/1992 |
| JP | 8300418 | | 11/1996 |

\* cited by examiner

*Primary Examiner*—Jill L. Heitbrink
(74) *Attorney, Agent, or Firm*—Varndell & Varndell PLLC

(57) ABSTRACT

An injection molding method and device, wherein, in order to minimize dimension errors of molded products, molten resin is injected from a nozzle (23) retaining therein pre-pressurized molten resin such as plastic into the cavity (3) via an annular gate (24).

6 Claims, 11 Drawing Sheets

INJECTION MOLDING METHOD AND DEVICE

CROSS-REFERENCE TO RELATED APPLICATIONS

This application is a U.S. national phase application of International Application No. PCT/JP00/06540 filed Sep. 22, 2000, which application was not published in English.

TECHNICAL FIELD

This invention relates to improvement of injection molding methods and apparatuses which inject molten synthetic resin such as plastic into a closed mold and later open the mold and extract the cooled/solidified molded product to obtain the desired molded product.

BACKGROUND ART

Over the years, various injection molding methods and apparatuses have been provided as methods and apparatuses for obtaining molded products with comparatively high precision from synthetic resins such as plastic.

In particular, among the above-mentioned injection molding methods and apparatuses, in recent years injection molding method and device have been proposed for reducing the molding cycle time for molded products.

This conventional injection molding method or apparatus comprises a nozzle for temporarily holding pre-pressurized molten resin and a valve pin positioned inside the nozzle such that it can be freely inserted or withdrawn. A gate is opened by means of this valve pin to fill the cavity inside the mold with the pre-pressurized molten resin and, after completion of filling the cavity with molten resin, the gate is again closed by means of the valve pin.

To obtain relatively large molded products, conventionally, a plurality of valves having the above-mentioned valve pins are arranged to face the cavity in the mold, and molten resin is injected simultaneously from each gate of the plurality of nozzles into the cavity to fill it.

According to this kind of injection molding method and device, during the time the mold is opened to take out the molded product, the molten resin in the nozzle is pre-compressed. Therefore, the wasted time required for compressing the molten resin until injection is reduced and, as a result, there is the effect that the molding cycle time is shortened.

FIG. 8 is a cross-section diagram outlining the main parts of the above-mentioned injection molding apparatus 1, and particularly showing injection molding apparatus 1 for molding disk-shaped parts having a bearing hole in their centers (for example, molded products such as gears.)

The injection molding apparatus 1 comprises upper mold 2 in which is provided valve main units (not shown in the figure) that pre-compress the molten resin and lower mold 4 in which disk-shaped cavity 3 is formed. Of these upper and lower molds, a plurality of nozzles 5 are provided in specified locations within upper mold 2.

In addition, the configuration is such that a plurality of gates 6, each consisting of a circular hole, is penetratingly formed at the bottom end of each of nozzles 5 and in the upper surface 3a of cavity 3, corresponding to the plurality of nozzles 5, and disk-shaped cavity 3 is filled with molten resin from the plurality of gates 6 simultaneously.

Also, inside of each of these nozzles 5, valve pin 7 is arranged facing gate 6 such that it can be inserted and withdrawn in the vertical direction, and so that the downward movement of the valve pin 7 closes gate 6 and thus stops the injection of molten resin into cavity 3 (so called "gate cut").

In the center of cavity 3 of lower mold 4, cylinder-shaped core 8 is positioned to form the central hole of the disk-shaped molded product that is formed by the molten resin which fills the mold. Ejector pins 9 are provided around the core 8 so as to be freely movable upward/downward relative to core 8, for removing the cooled/solidified molded product from cavity 3.

Next will be explained the operation of the above conventional injection molding apparatus 1.

Due to the upwardly retracted position of valve pin 7 as shown in FIG. 8, gate 6 is in the open state. Thus, the molten resin which was compressed inside the main body of the valve (not shown in the figure) is injected into cavity 3 via each of the gates 6 of the plurality of nozzles 5 as shown by the arrows.

At this time, as in FIG. 9 which shows a schematic cross sectional view taken at A—A of FIG. 8, molten resin is injected concentrically into cavity 3 from each of the plurality of gates 6 positioned at different locations, as shown by the arrows. These injected molten resins collide and mix so that the cavity 3 becomes filled.

When, the molten resin is injected into cavity 3 via the plurality of gates 6 in this way and filling is completed, valves 7 move downward as shown by the arrows in FIG. 10 and each gate 6 closes. As a result, injection of molten resin into cavity 3 is stopped (so-called "gate cut").

Afterward, using cooling means not shown in the figure, the molten resin with which cavity 3 has been filled is cooled and solidified.

After the molten resin filling cavity 3 is solidified in this way, the mold is opened by separating the upper mold 2 and lower mold 4, and disk-shaped molded product 10 of solidified molten resin remains in cavity 3 of lower mold 4.

Afterward, when each of the plurality of ejector pins 9 is moved upward parallel to core 8 as shown in FIG. 11, disk-shaped molded product 10 is extracted from cavity 3 of lower mold 4, while its lower face is supported by ejector pins 9.

With this kind of conventional injection molding apparatus 1, as revealed in FIG. 12 which shows an elevation view of molded product 10 and FIG. 13 which shows a plan view of molded product 10, molded product 10 (for example, a flat gear) is integrally formed into a disk shape with bearing hole 10A in its center.

However, with the above-mentioned conventional injection molding method and device 1, as shown in FIG. 9, molten resin is injected in cavity 3 in a concentric manner as shown by the respective arrows from each of the plurality of gates 6 positioned in different locations. The cavity 3 is filled as the molted resin collides and mixes within each injection from respective gates 6, but the molten resin injected from different gates 6 does not mix each other under uniform melt conditions in cavity 3. As a result, there is a danger that molten resin boundary regions will be generated in cavity 3 by the molten resin injected from each of the plurality of gates 6 positioned in different locations.

If such molten resin boundary regions are generated in cavity 3 by the molten resin injected from the plurality of gates 6 positioned in different locations, then, as shown in the elevation view of FIG. 12 and the plan view of FIG. 13, shrinkage action begins at each boundary region in the molded product the is extracted after being cooled and solidified. Due to the shrinkage action, deformed areas 10*b* and 10*c*, or so-called "sinks", occur on the surface, etc. of molded product 10. This can be a major cause of dimension errors in molded product 10.

Since molded products in which sinks occurred must be re-processed for dimensional correction, there is the defect that manufacturing cost of molded products becomes extremely high.

With the foregoing in view, an object of the present invention is to provide an injection molding method and device which reduce the dimension errors of molded products as much as possible.

DISCLOSURE OF THE INVENTION

To solve the above-mentioned defect, the present invention is an injection molding method wherein molded products of synthetic resin are obtained by injecting pre-pressurized molten resin such as plastic from molten resin storing nozzles into a mold cavity via a gate and cooling and solidifying the molten resin injected into the cavity, characterized in that the gate is formed in an annular shape and molten resin is injected into the cavity via the annular gate.

BEST MODE FOR CARRYING OUT THE INVENTION

One embodiment of the injection molding method and device according to the present invention is described in detail below.

Figure 1:
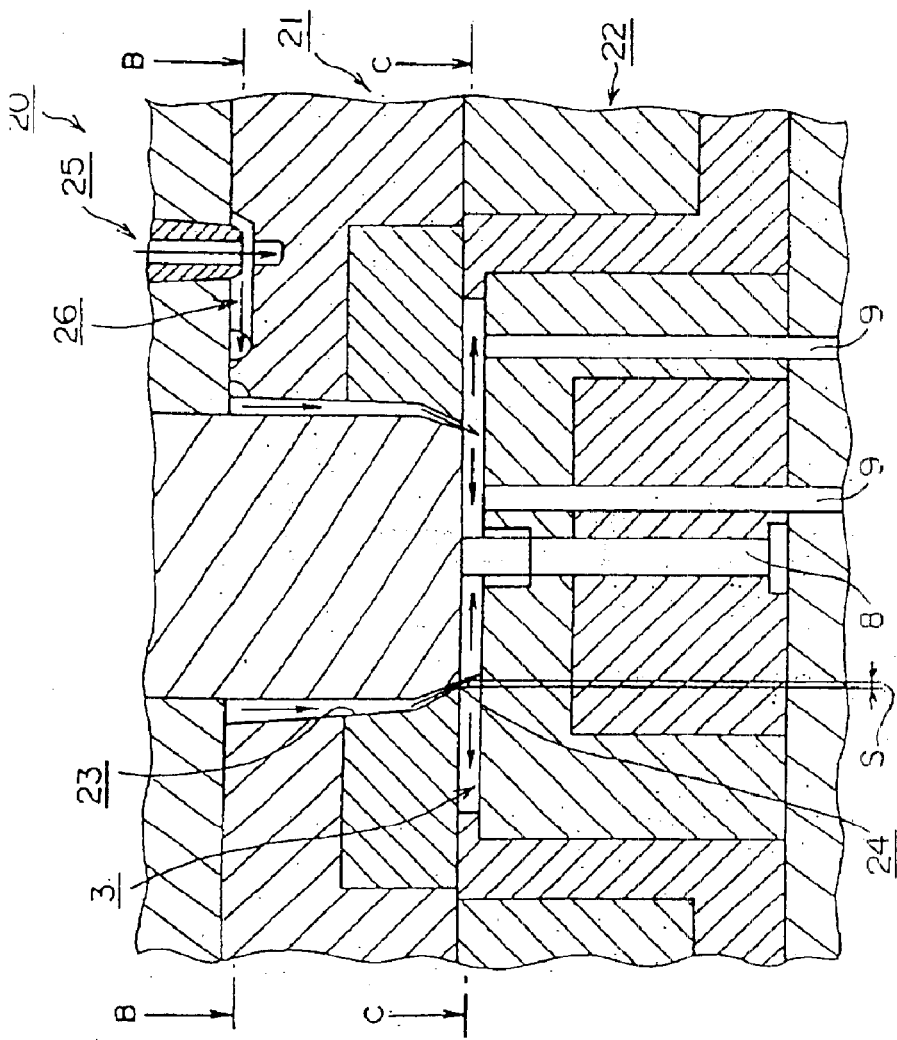
FIG. 1 is a schematic cross section view of injection molding apparatus which embodies the injection molding method of the present invention.
Figure 8:
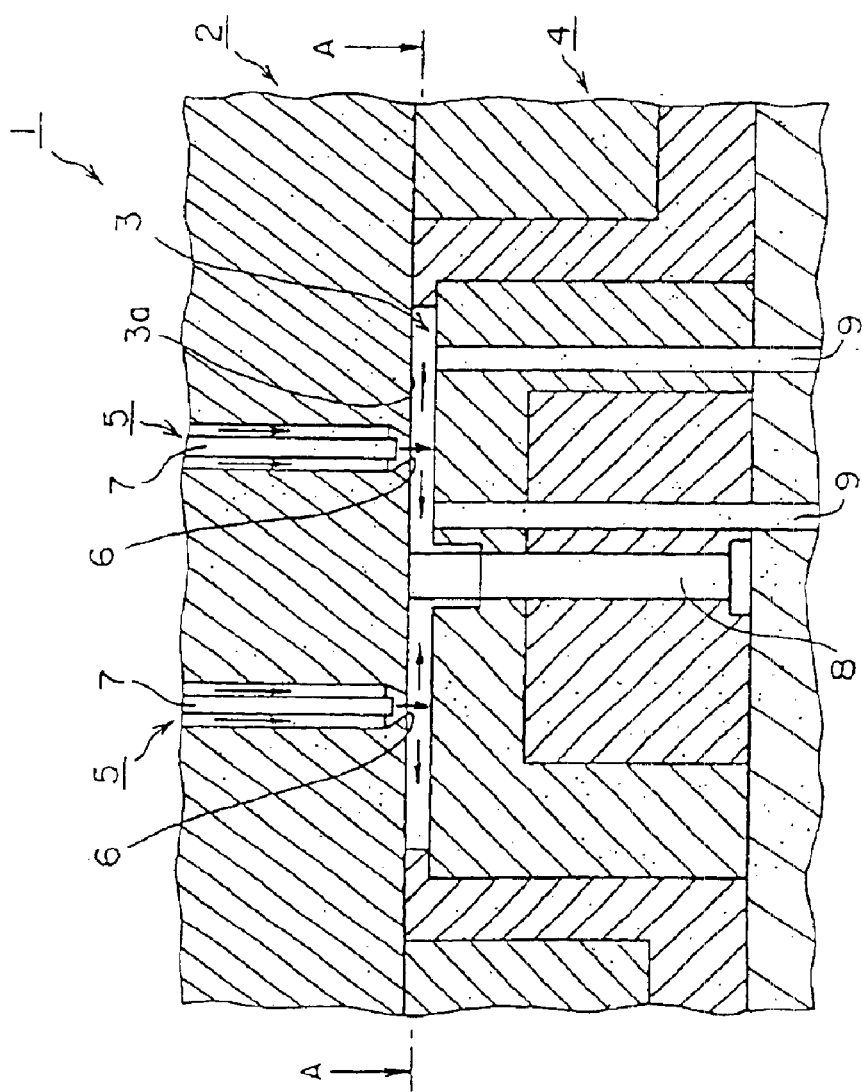
FIG. 8 is a schematic cross section view of a conventional injection molding apparatus.
Figure 9:
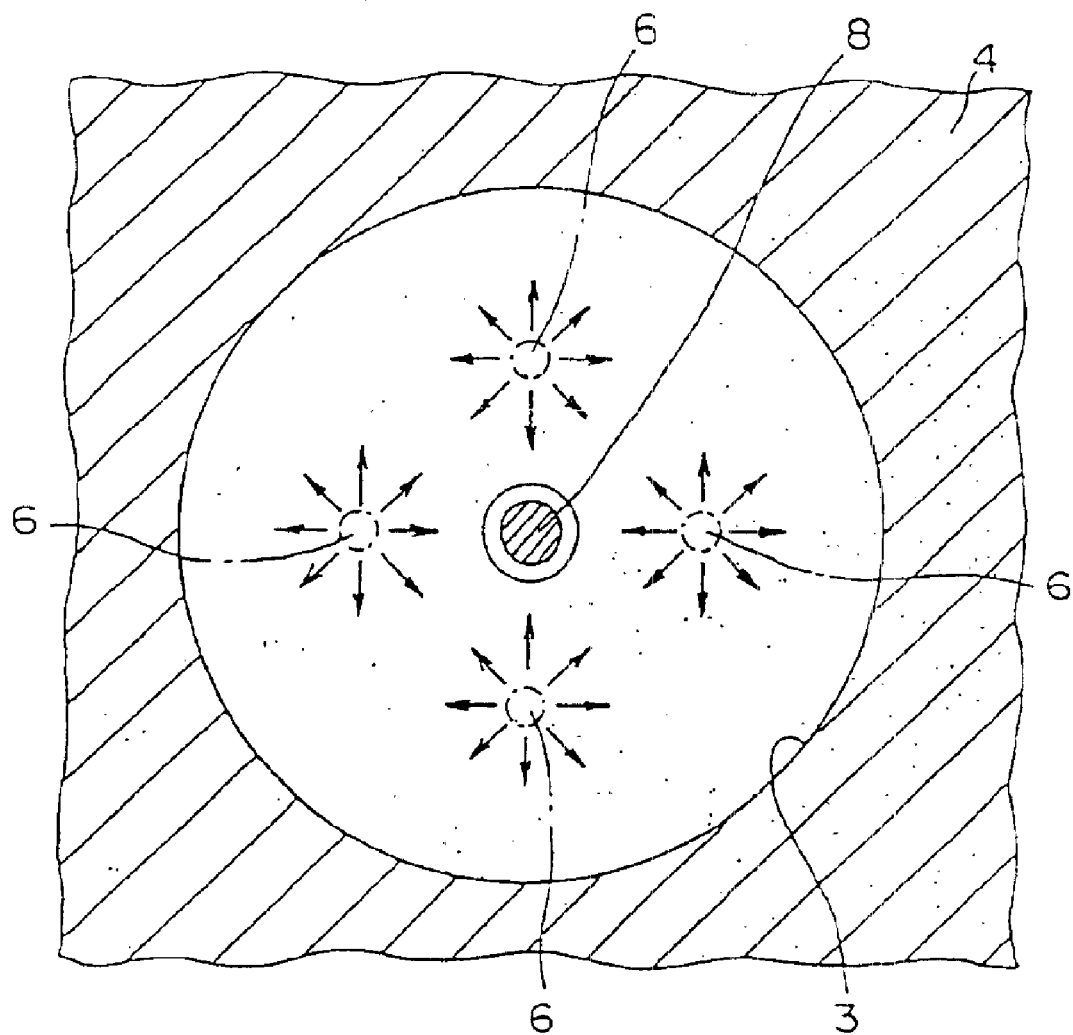
FIG. 9 shows the injection state of the molten resin inside the cavity of the conventional injection molding apparatus.
Figure 10:
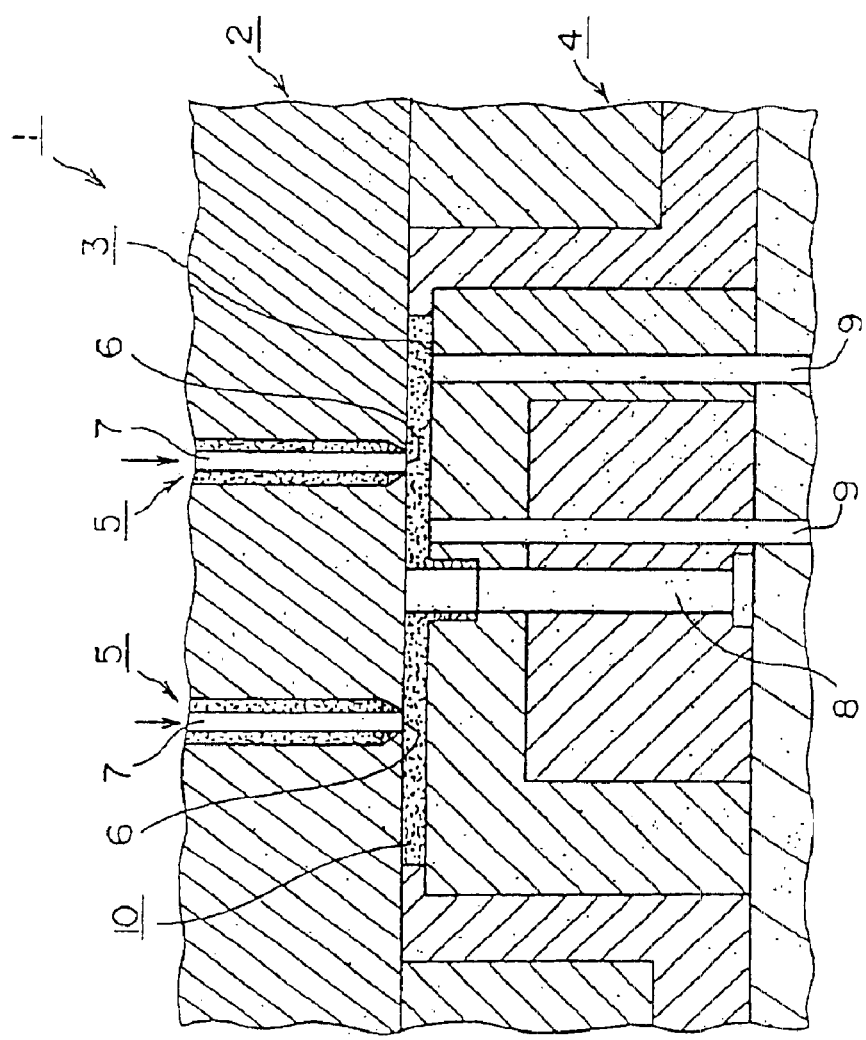
FIG. 10 is a schematic cross section view showing operation of the conventional injection molding apparatus.
Figure 11:
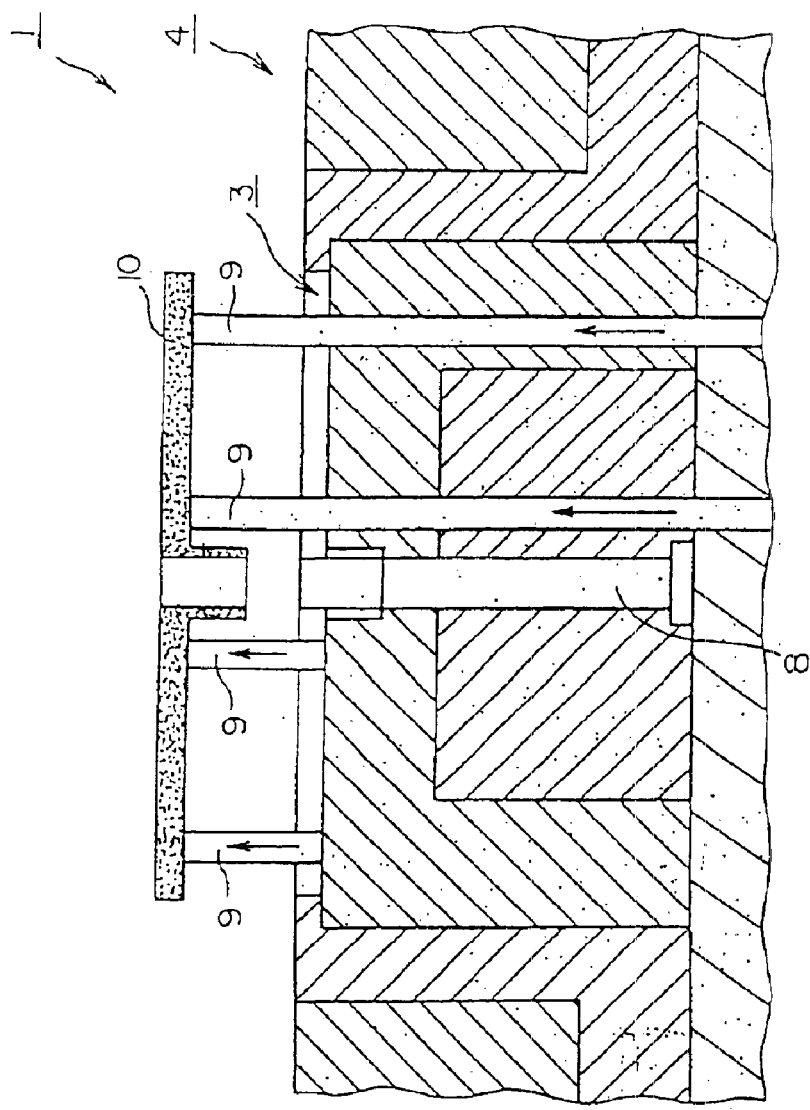
FIG. 11 is a schematic cross section view showing operation of the conventional injection molding apparatus.
Figure 12:
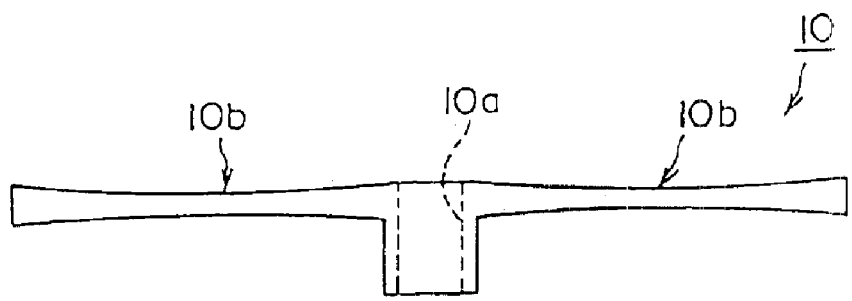
FIG. 12 is an elevation view of a molded product obtained from the conventional injection molding apparatus.
Figure 13:
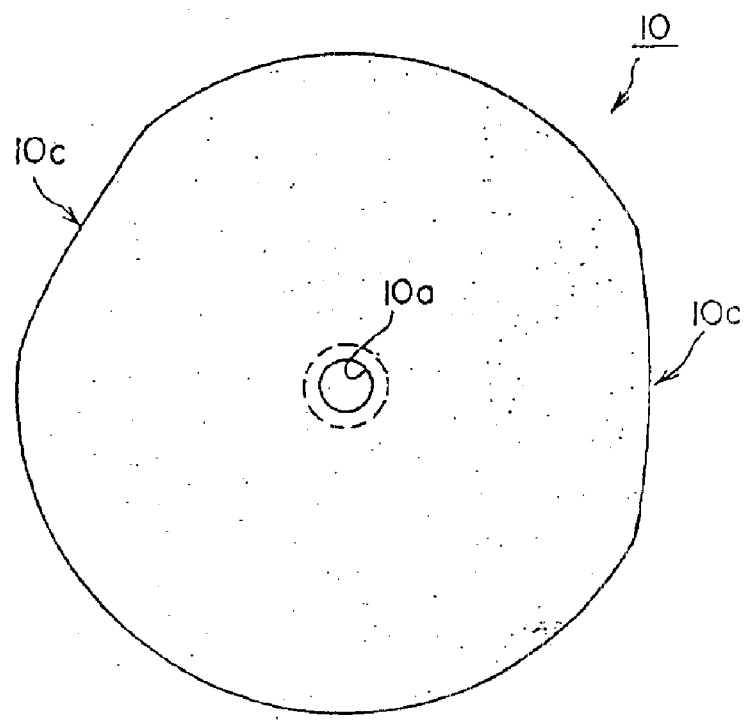
FIG. 13 is an elevation view of a molded product obtained from the conventional injection molding apparatus.

FIG. 1 is a schematic cross section view of injection molding apparatus 20 for implementing the injection molding method of the present invention. The components that are the same as in FIG. 8 are identified with the same reference numbers.

This injection molding apparatus 20 (below, simply "apparatus") also comprises upper mold 21 and lower mold 22. However, in upper mold 21, only one nozzle 23 is provided for injecting molten resin.

The nozzle 23 is formed in an annular shape (in the embodiment, a cylinder shape) which surrounds core 23 concentrically.

In the bottom end of this one nozzle 23 which is formed in an annular shape, an annular gate 24 (in the embodiment, circular) is formed which surrounds core 8 concentrically, in the same way as nozzle 23. The diameter of the gate 24 is formed slightly smaller than the diameter of nozzle 23. The gate width S of the annular gate 24 is extremely narrow. In the embodiment, it is set to the order of 0.14–0.16 millimeters.

On the other hand, a manifold 25 is provided in upper mold 21 to supply thermally molten resin thereto, and communication between its lower end and annular nozzle 23 is accomplished via a runner 26 which guides the molten resin.

Figure 2:
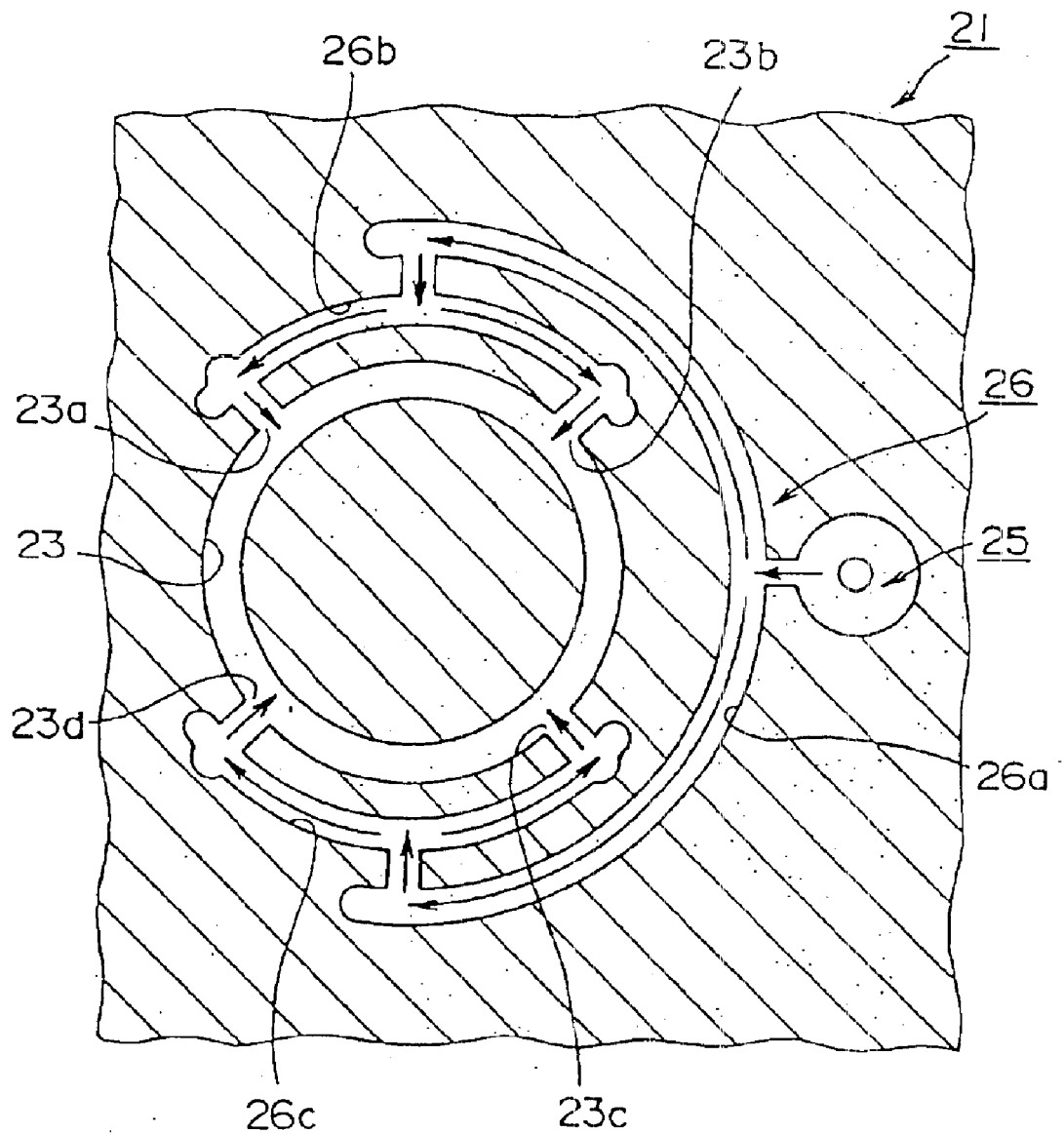
FIG. 2 is a plan view of the runner which guides the molten resin.

As in FIG. 2, which shows a B—B cross section of FIG. 1, runner 26 comprises three circular arc channels (first arc channel 26*a*, second arc channel 26*b*, and third arc channel 26*c*) which partially surround the outer perimeter of annular nozzle 23.

The channel lengths of first and third arc channels 26*b* and 26*c* are set to be the same.

On the outer perimeter surface of annular nozzle 23, resin injection ports 23*a*, 23*b*, 23*c* and 23*d* are formed at a spacing of every 90° along the circumferential direction thereof.

Of these, each of the adjacent resin introduction ports 23*a* and 23*b* communicates with the corresponding end of second arc channel 26*b*, while each of the adjacent resin introduction ports 23*c* and 23*d* communicates with the corresponding end of third arc channel 26*c*.

In addition, the central part of each of above-mentioned second and third arc channels 26*b* and 26*c* communicates with the corresponding end of first arc channel 26*a* that has the longest channel length in runner 26.

Using runner 26 formed in this way, the length of each channel which delivers molten resin from manifold 25 to each of the four resin injection holes 23*a*, 23*b*, 23*c* and 23*d* is the same. As a result, various parameters (such as temperature, volume, viscosity) of the molten resin which flows from manifold 25 to the interior of the each of the resin injection holes 23*a*, 23*b*, 23*c*, 23*d* will be the same. Thus, the molten resin from each of the resin injection holes 23*a*, 23*b*, 23*c*, 23*d* will flow uniformly into annular nozzle 23 under the same conditions.

Next will be explained the operation of above-mentioned injection molding apparatus 20 according to the present invention and at the same time the configuration will be explained in more detail.

As shown in FIG. 1, if molten resin compressed in the valve main body (not shown in the figures) is sent under pressure within manifold 25, that molten resin will travel, as shown by the arrows in FIG. 2, via runner 26 comprising three arc channels (first arc channel 26*a*, second arc channel 26*b*, and third arc channel 26*c*), and be injected under the same conditions into each of the resin injection cells 23*a*, 23*b*, 23*c*, 23*d* of annular nozzle 23.

On the other hand, when the molten resin from each of the resin injection holes 23*a*, 23*b*, 23*c*, 23*d*, under the same conditions, is injected into annular nozzle 23 and fills it, that molten resin is injected simultaneously into cavity 3 through annular (circular) gate 24 shown in FIG. 1.

Figure 3:
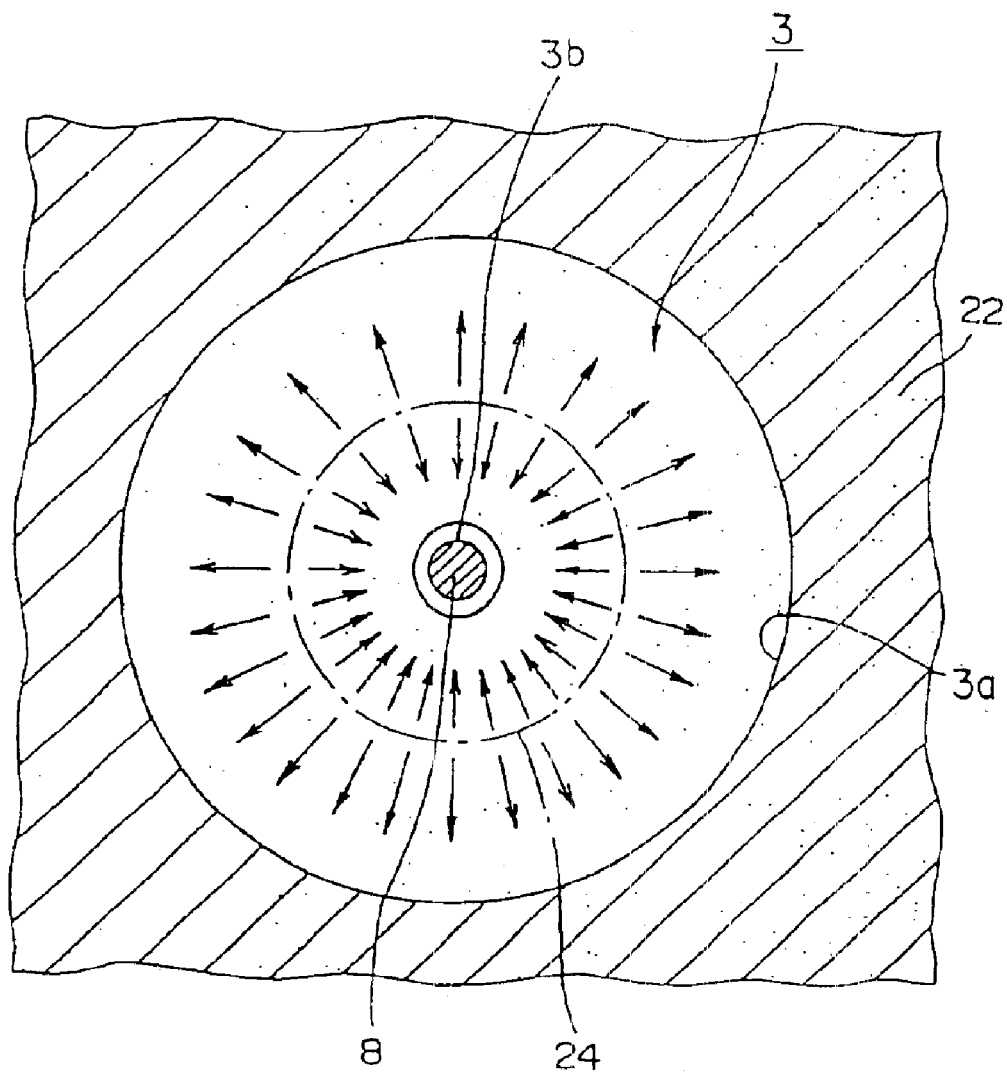
FIG. 3 shows the injection state of the molten resin inside the cavity.

At that time, as in FIG. 3 which shows a schematic cross section view at C—C of FIG. 1, inside cavity 3, the molten resin from the single gate 24 which is formed in an annular shape is concentrically injected (as shown by the arrows) simultaneously toward the outer perimeter face 3a and the inner perimeter face 3b of cavity 3, while maintaining uniform and identical molten conditions, and fills the cavity.

Consequently, the molten resin injected from the single gate 24, that is formed in an annular shape as shown in FIG. 3, concentrically and towards the outer perimeter face 3a and the inner perimeter face 3b of cavity 3 as shown by the arrows is mixed in the uniform and identical molten state, and therefore the risk of generation of boundary regions inside cavity 3 is reduced remarkably.

Figure 4:
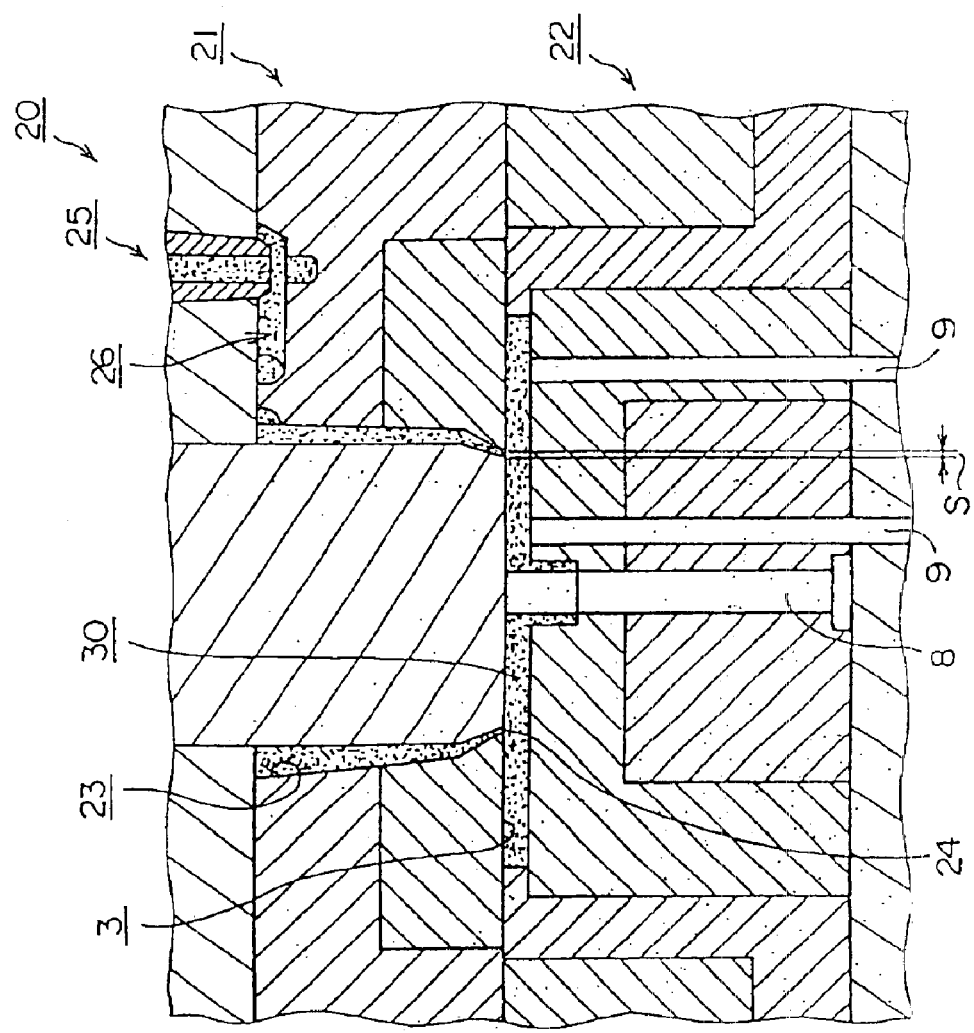
FIG. 4 is a schematic cross section view showing operation of the injection molding apparatus of the present invention.

After molten resin from the single gate 24 which is formed in an annular shape is injected into cavity 3 and filling is completed as shown in FIG. 4, the pre-pressurization of the molten resin in nozzle 23 by means of valve main body (not shown in the figure) is released.

On the other hand, because the gate width S of the annular gate 24, as mentioned above, is set to be extremely narrow (in this embodiment, on the order of 0.14–0.16 millimeters), none of the no longer pre-pressurized molten resin will leak anew from there (from annular gate 24) into cavity 3. Consequently, in the embodiment, simply by releasing the pre-pressurization of the molten resin, injection of molten resin into cavity 3 can be stopped (so-called "gate cut").

Afterward, using cooling means not shown in the figure, the molten resin which filled cavity 3 is cooled and solidified.

In this way, the molten resin which filled cavity 3 is solidified and the result is that disk-shaped molded product 30 of solidified molten resin remains in cavity 3.

Figure 5:
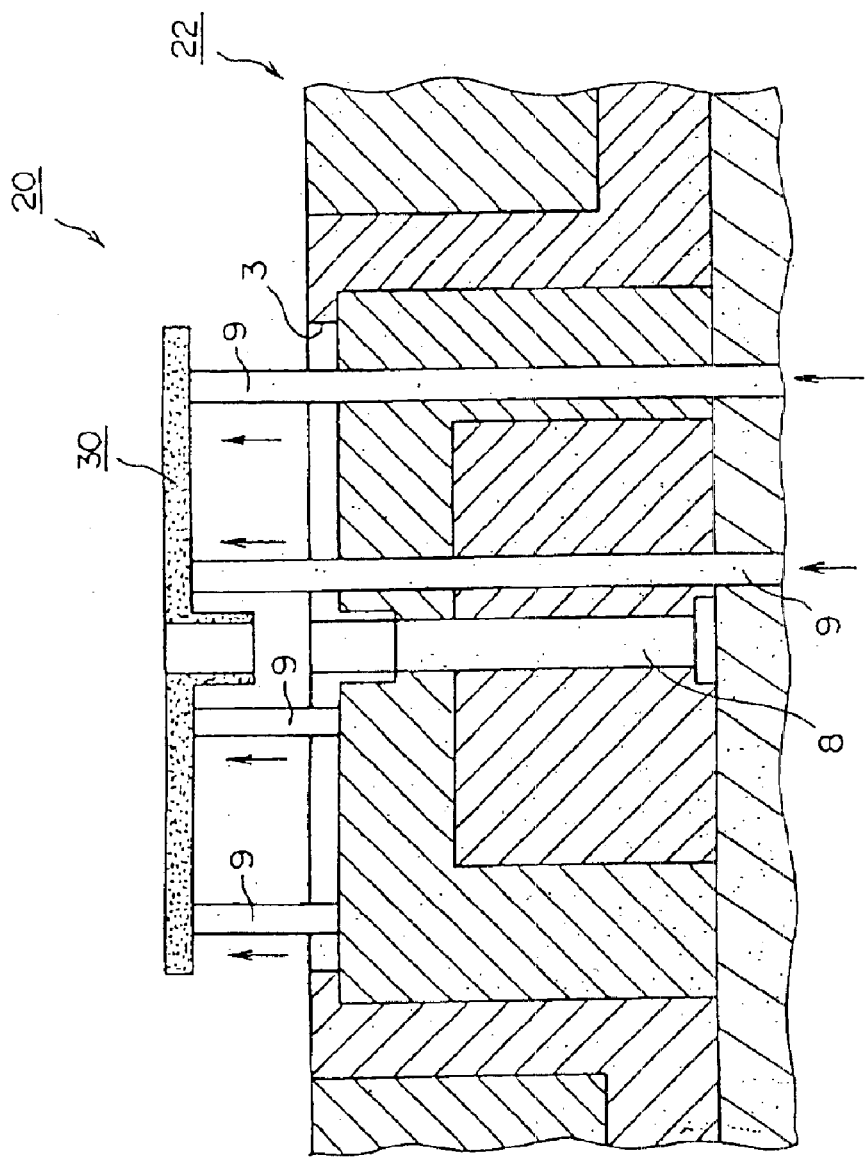
FIG. 5 is a schematic cross section view showing operation of the injection molding apparatus of the present invention.

Afterward when the mold is opened by separating upper mold 21 from lower mold 22, and the plurality of ejector pins 9 is raised parallel to core 8 as shown in FIG. 5, disk-shaped molded product 30 can be extracted from cavity 3 of lower mold 4, while its lower face is supported by ejector pins 9.

Figure 6:
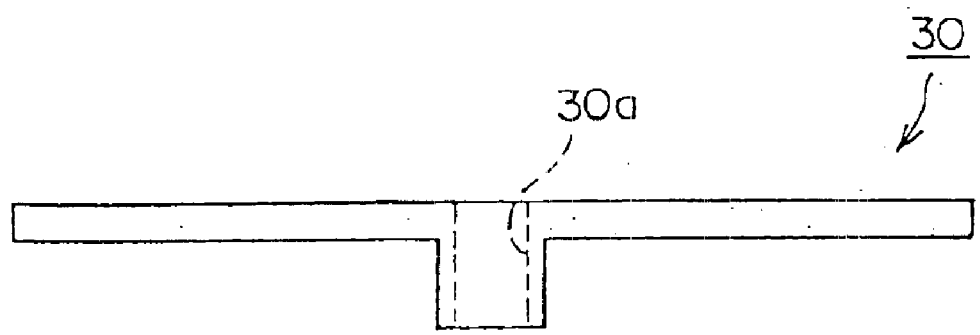
FIG. 6 is an elevation view of a molded product obtained from the injection molding apparatus of the present invention.
Figure 7:
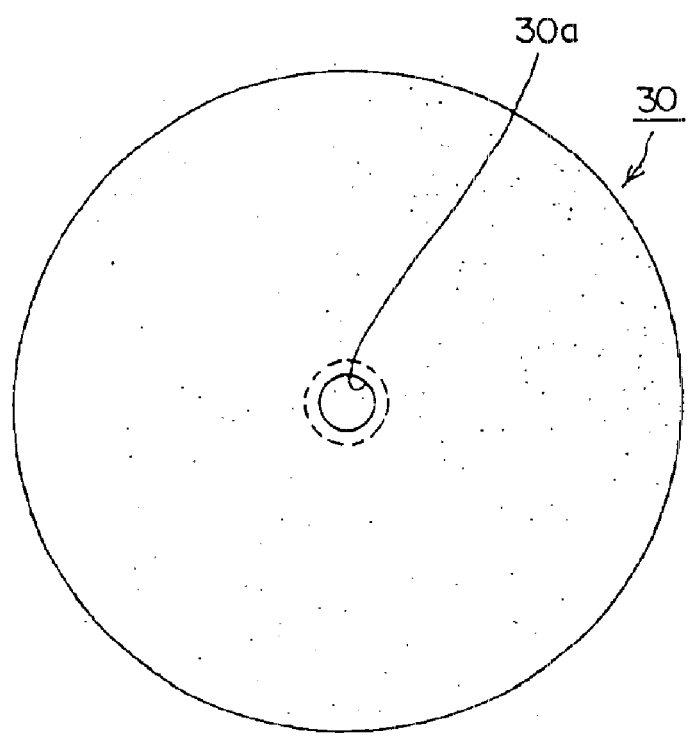
FIG. 7 is a plan view of a molded product obtained from the injection molding apparatus of the present invention.

With molded products 30 obtained from this injection molding apparatus 20, as shown in the elevation view of FIG. 6 and the plan view of FIG. 7, a disk-shaped molded product 30 (for example a flat gear, etc.) with bearing hole 30a formed in its center is integrally molded.

On the other hand, the molded product 30, which is removed from the cavity 3 following cooling and solidification, is obtained by mixing the molten resin injected into cavity 3 from annular gate 24 shown in FIG. 3 under uniform environmental conditions without producing any boundary regions. As a result, non-uniform molding shrinkage action, which starts at each boundary region during cooling/solidification, is prevented as much as possible, and thus deformations such as so-called "sinks", which occur on the surface, etc. of molded product 30, are prevented. Consequently, injection molded products 30 with extremely high dimensional precision can be obtained.

In the above-mentioned embodiment annular nozzle 23 is formed in a cylinder shape and annular gate 24 is circularly shaped. However, the present invention is not limited to the above embodiment. The shapes of nozzle 23 and gate 24 simply need to be annular in shape. Thus, the shape of these components can correspond to the shape of the molded product and therefore it may be square, triangular or etc. There is no limitation on the shape of these components.

In the above embodiment, as an example of a molded product formed by means of the injection method and apparatus of the present invention, disk-shaped molded product 30 with a bearing hole formed in its center was used. However, of course, the molded products molded according to the injection method and apparatus of the present invention need not be limited to disk-shaped molded product 30, but a square or triangle, etc. in the planar view would also be acceptable. There is no limitation on the shape of the molded products.

Consequently, the present invention can be applied to all molded products molded from synthetic resin, such as compact disks (CD's), various kinds of gears, floppy disk cases, cassette reels for audio cassettes, etc.

As explained above, through the injection molding method and device of this invention, molten resin is injected into a cavity from an annular gate, and thus the molten resin is mixed inside the cavity under uniform melt conditions. Because no molten resin boundary regions are generated in the cavity, during cooling and solidifying of the molten resin, non-uniform molding shrinkage action, which starts at each boundary region during cooling and solidifying, is prevented as much as possible. As a result, deformations such as so-called "sinks", which occur on the surface, etc. of molded products, are prevented and injection molded products with extremely high dimensional precision can be provided.

INDUSTRIAL APPLICABILITY

As explained above, the injection molding method and device of the present invention are suitable for reducing as much as possible dimension errors in molded products.

What is claimed is:

1. A method of injection molding in which a pre-pressurized molten resin is injected from a nozzle of annular shape having an outer peripheral surface into an interior portion of a cavity of a mold via a gate, and the molten resin injected into the cavity is cooled and solidified whereby a molded product of synthetic resin is obtained, the method comprising the steps of:

providing molten resin supplying means radially outside of the annular shape of the nozzle, and providing a plurality of resin injection holes along the outer peripheral surface of the nozzle in an equal interval; and guiding the molten resin from the molten resin supplying means to the plurality of the resin injection holes by using a runner having minimum distances of communication between the molten resin supplying means and each of the resin injection holes that are equal to each other.

2. The method of injection molding as set forth in claim 1, wherein molten resin is guided from the molten resin supplying means to the plurality of the resin injection holes along a path perpendicular to a molten resin supply direction of the molten resin supplying means.

3. An apparatus for injection molding in which a pre-pressurized molten resin is injected from a nozzle of annular shape having an outer peripheral surface in to an interior portion of a cavity of a mold via a gate, and the molten resin injected into the cavity is cooled and solidified whereby a molded product of synthetic resin is obtained, the apparatus comprising:

molten resin supplying means rally disposed outside of the annular shape of the nozzle;

a plurality of resin injection holes provided along the outer peripheral surface of the nozzle at equal intervals; and a runner that communicates the molten resin supplying means with the plurality of the resin injection holes, the runner comprising a plurality of channels, each of the plurality of channels partially surrounding the nozzle, passages that communicate the plurality of channels with each other, and passages that communicate the channels with the resin injection holes, wherein minimum distances of communication between the molten resin supplying means and each of the resin injection holes are equal to each other.

4. The apparatus for injection molding as set forth in claim 3, wherein the plurality of channels comprise:

a first channel that is communicated with the molten resin supplying means; and a pair of second channels having a same channel length, a center portion of each of the second channels being communicated with a corresponding end portion of the first channel and end portions of each of the second channels being communicated with a corresponding one of the resin injection holes.

5. The apparatus for injection molding as set forth in claim 3, wherein the plurality of channels are arranged and extend perpendicularly relative to a direction of molten resin supply from the molten resin supplying means.

6. The apparatus for injection molding as set forth in claim 3, wherein the plurality of channels are arranged in a common plane.

* * * * *